Jan. 21, 1930.  E. RICARD  1,744,503
PROCESS OF MANUFACTURE OF ABSOLUTE ALCOHOL
Filed Jan. 23, 1924   3 Sheets-Sheet 1
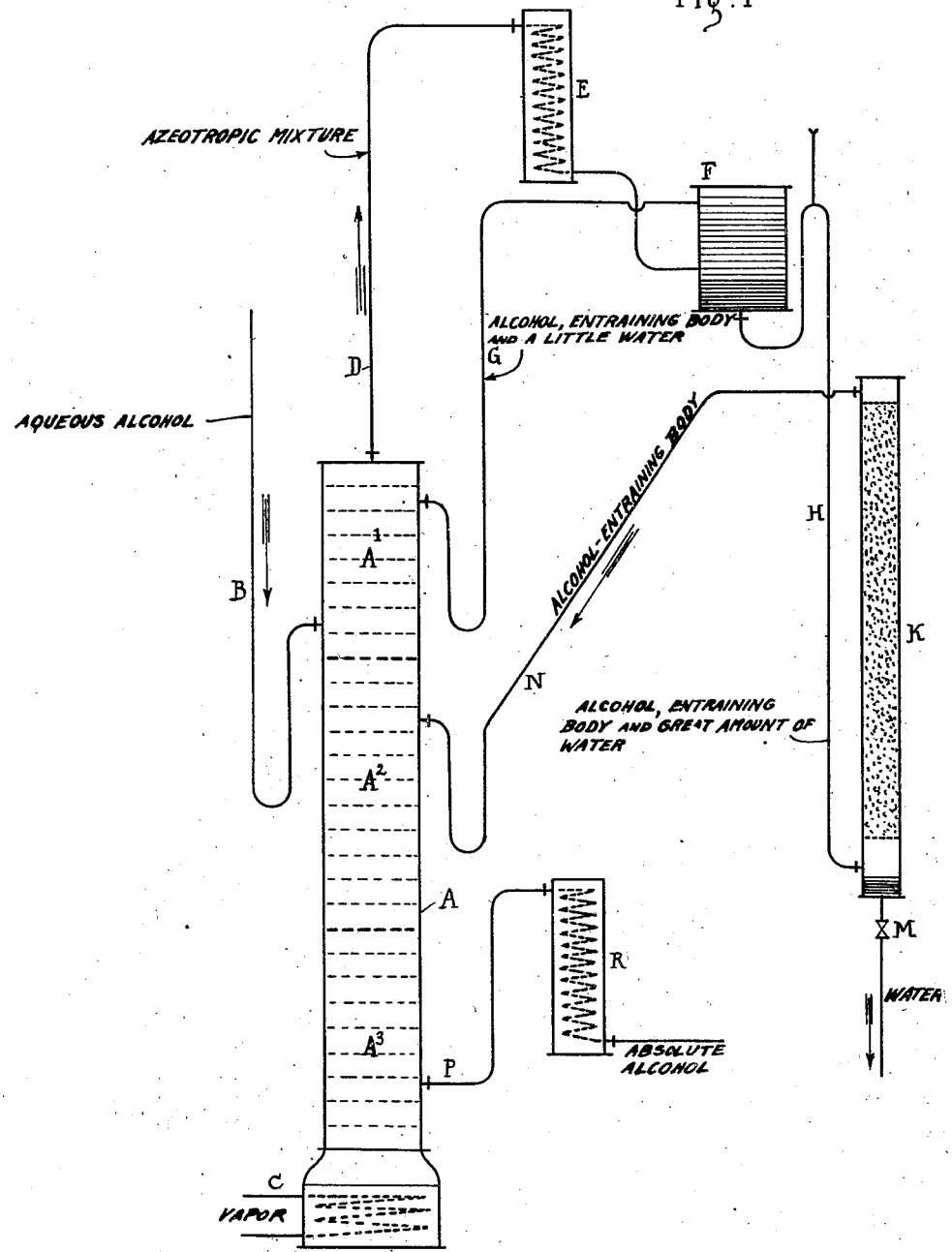

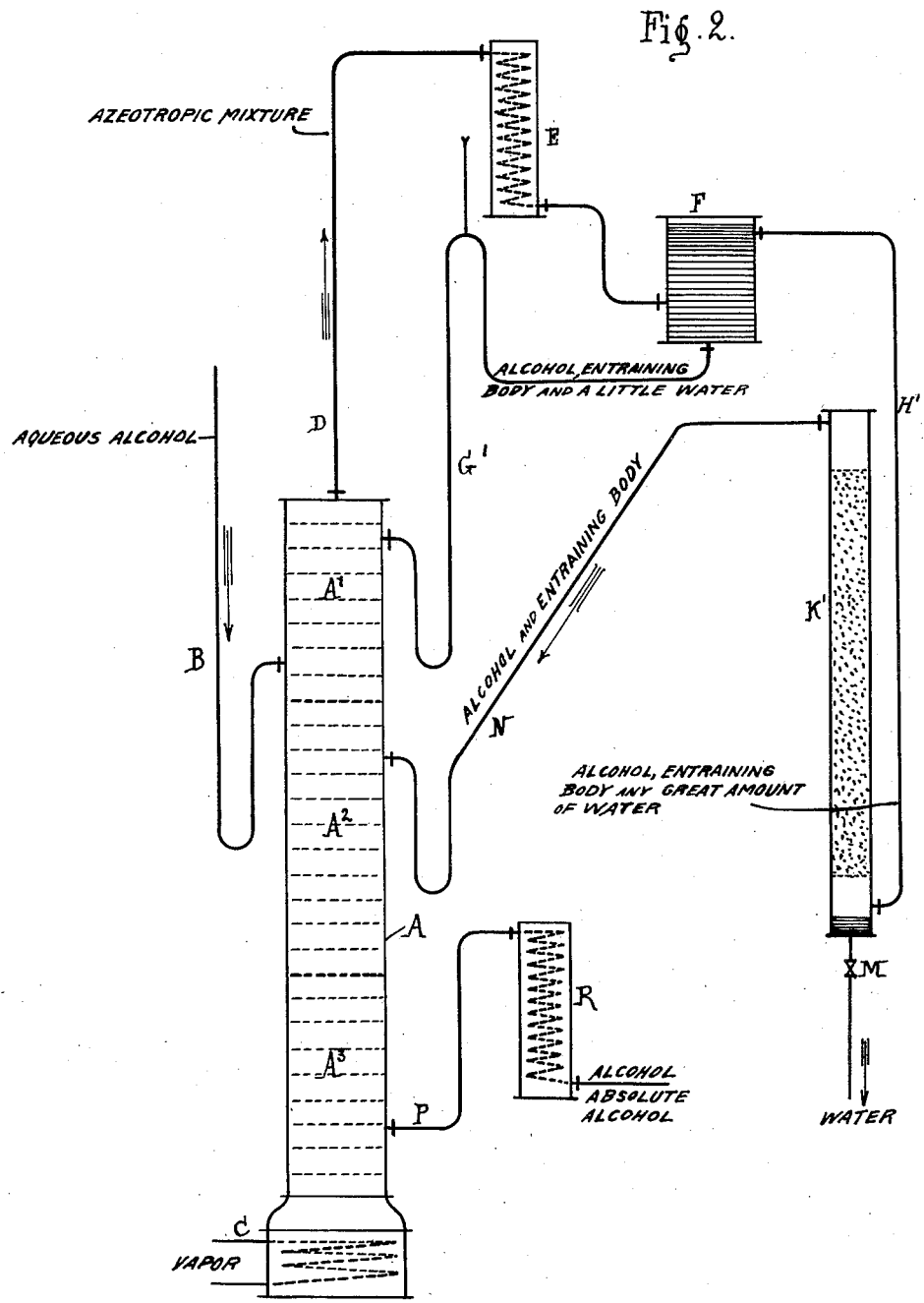

Jan. 21, 1930.  E. RICARD  1,744,503
PROCESS OF MANUFACTURE OF ABSOLUTE ALCOHOL
Filed Jan. 23, 1924  3 Sheets-Sheet 3
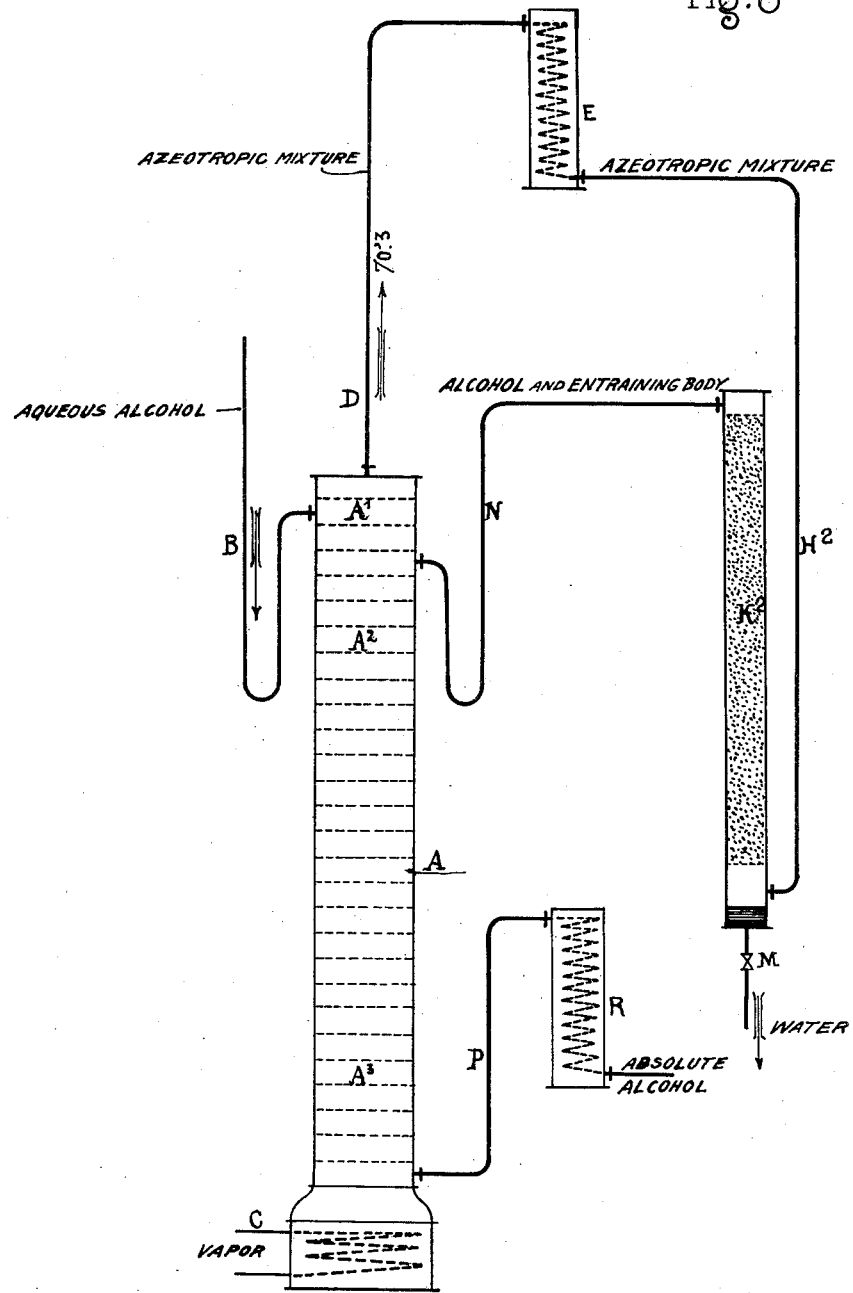

Patented Jan. 21, 1930

1,744,503

UNITED STATES PATENT OFFICE

ELOI RICARD, OF MELLE, FRANCE, ASSIGNOR, BY MESNE ASSIGNMENTS, TO U. S. INDUSTRIAL ALCOHOL CO., OF NEW YORK, N. Y., A CORPORATION OF WEST VIRGINIA

PROCESS OF MANUFACTURE OF ABSOLUTE ALCOHOL

Application filed January 23, 1924, Serial No. 688,049, and in Belgium February 15, 1923.

This invention relates to a process of manufacture of absolute alcohol whereby it can be obtained in a simple and economical manner, said process being carried out by a certain number of successive operations, as follows:

*a*. To the commercial alcohol to be dehydrated is added a liquid substance capable of forming by distillation with water and alcohol a ternary mixture of an azeotropic nature which serves to withdraw the water. The said mixture forms either a homogeneous liquid or a liquid which becomes separated into two layers, and a residue will remain in the shape of a binary mixture from which the alcohol can be distilled off.

*b*. I treat the said homogeneous liquid, or each liquid forming the two layers, or otherwise the aggregate of the non-homogeneous layers, by the use of known de-hydrating substances such as the carbonates of potassium of sodium, and the like, in order to remove the water therefrom and to obtain a binary mixture from which the absolute alcohol can be distilled off.

*c*. An alternative method is to separately treat the liquid of each layer by distillation so as to extract therefrom a ternary mixture of an azeotropic nature and to leave a binary mixture. In the most aqueous layer, the said binary mixture will contain water which is to be separated by distillation or like means. In the least aqueous layer, the resulting binary mixture contains no water, and the alcohol can be separated from the liquid substance employed by distillation or by like means.

My said process of manufacture is carried out in the following manner:

1. By adding to commercial alcohol (ethyl alcohol usually containing less than 10 per cent of water) certain liquids which are not miscible with water and whose boiling points are close to those of alcohol, such for instance as hydrocarbons, alkyl chlorides, chlorides of ethylene and acetylene, tetrachloride of carbon, esters, ether and the like, I constitute mixtures which upon distillation will produce as is well known ternary mixtures of an azeotropic nature i. e. mixtures whose boiling point is below the boiling points of the three constituents. To facilitate the description, such substances will be termed "withdrawing bodies".

Various experiments I have made show that one of the best withdrawing bodies can be obtained by the use of petroleum product such as a gasoline selected so as to exclude all substances distilling below 80 degrees C. and whose boiling points from the beginning to the end of the distillation show a total difference of only a few degrees.

When a mixture as above indicated is distilled in a boiler, its constituents pass off into the vapour in fixed and invariable proportions, as long as these substances are simultaneously contained in the mixture to be distilled. It is evident that after a time (except in the particular case in which the constituents are exactly in the same proportions as in the azeotropic mixture formed) this mixture will be exhausted of one of the three constituents. In this case there will remain only a binary mixture in the boiler which contained the original mixture under distillation.

The "withdrawing body" to be added to the commercial alcohol may be so chosen that in the distilling process the ternary mixture shall become exhausted of water as rapidly as possible; the remaining binary mixture will be composed of absolute alcohol and the "withdrawing body" from which it will be easy to extract the absolute alcohol by known means used in distillation processes.

2. The condensed vapours forming the azeotropic mixture obtained by distilling the mixture of commercial alcohol and the withdrawing body will produce either a homogeneous liquid or a liquid which separates into two layers.

In the first case, the homogeneous liquid may be de-hydrated by known substances readily absorbing water, and this liquid is converted into a binary mixture from which it is an easy matter to remove the absolute alcohol as well as the alcohol contained in the boiler residue.

In the second case, the two resulting layers contain different proportions of the three constituents. Preference will be given to a withdrawing body of such nature that one of the liquid layers which are formed shall contain a much greater amount of water than the other.

The layer containing the most water can be de-hydrated by known water-absorbing substances, and the result will be a binary mixture from which it is an easy matter to remove the absolute alcohol as well as the alcohol contained in the boiler residue.

The layer containing the least water can be de-hydrated in like manner, or if desired it can be again placed in the distilling apparatus and thus be distilled a second time.

3. The layer having the most water will contain by reason of its formation a larger proportion of water than what enters into the vapours during the distillation of the azeotropic mixture. Instead of treating the same by water-absorbing substances for the de-hydration, it may be again distilled if desired so as to extract a ternary azeotropic mixture which is then added to the first. After a time, it will become exhausted of one of the constituents, alcohol or withdrawing product, so as to leave the binary mixture (water and withdrawing product) or the binary mixture (water and alcohol) the percentage of water in the latter case being much larger than in the commercial alcohol whence it is derived. The water is subsequently removed with facility from the binary mixture by the known distilling processes or by like means.

Fig. 1 is a diagrammatic view showing one apparatus which may be used in accordance with my invention; Fig. 2 is a modified form of apparatus for use in connection with my invention; and Fig. 3 is still another modified form of apparatus for use in connection with my invention.

*Example I*

In this case the withdrawing body consists of butyl chloride.

In the distilling column A, Fig. 1, I introduce a quantity of butyl chloride. I then introduce the commercial alcohol to be de-hydrated (in the state of liquid or vapour) through the tube B. The withdrawing body and alcohol are introduced preferably in quantities such that the withdrawing body and the water of the alcohol have the ratio given hereinafter in the azeotropic mixture, the alcohol being present in a greater percentage than given in the azeotropic mixture, however. The withdrawing body can also be present in a somewhat greater ratio. The column is heated by means of the worm tube C. The vapour mixture of azeotropic nature is discharged through the conduit D at 63 degrees C. and it has substantially the following percentage composition by volume:

Butyl chloride_____ 76,7
Alcohol _____ 18,5
Water _____ 4,8

The said mixture is condensed in the refrigerating condenser E and collects in the receiver F wherein it separates into two layers. The upper layer represents 87 per cent of the azeotropic mixture and has the percentage composition by volume as follows:

Butyl chloride_____ 87
Alcohol _____ 11,75
Water _____ 1,25

The lower layer represents 13 per cent of the azeotropic mixture and has the percentage composition by volume as follows:

Butyl chloride_____ 8
Alcohol _____ 64
Water _____ 28

The upper layer is again caused to enter the column through the conduit G and is subjected to another distillation.

The lower layer proceeds through the conduit H to the de-hydrating apparatus K; the de-hydrating substance which may be any of the carbonates of sodium and potassium, sulphates of sodium, sulphates of copper, sulphates of magnesium, etc., withdraws the water in the liquid state, this being discharged through the cock M; the binary mixture of butyl chloride and alcohol is discharged at the upper part and returns to the column through the conduit N during the distillation in the column $A^1 \ A^2 \ A^3$. When distilled, it produces an azeotropic mixture whose boiling point is 65,7 degrees C.

The absolute alcohol is removed as vapour or liquid at P, and is cooled in the refrigerating apparatus R.

Three regions are in fact formed in the column, i. e. the upper region $A^1$ consisting of ternary mixture, the intermediate region $A^2$ consisting of binary mixture, and the lower region $A^3$ consisting of absolute alcohol, from which latter the alcohol is taken off.

*Example II*

In this case the withdrawing body consists of carbon tetrachloride.

In the distilling column A, Fig. 2, I dispose a quantity of carbon tertrachloride, I then introduce the commercial alcohol to be de-hydrated (in the state of liquid or vapour) through the tube B. The withdrawing body and alcohol are introduced preferably in quantities such that the withdrawing body and the water of the alcohol have the ratio given hereinafter in the azeotropic mixture, the alcohol being present in a greater percentage than given in the azeotropic mixture, however. The withdrawing body can also be present in a somewhat greater ratio. The column is heated by the worm tube C. The vapour mixture of an azeotropic nature is discharged through the conduit D at 61,1 degrees C. and it has the following approximate percentage composition by volume as follows:

Carbon tetrachloride _____ 78,10
Alcohol _____ 17,90
Water _____ 4,00

The said mixture is condensed in the refrigerating condenser E and collects in the receiver F wherein it separates into two layers. The upper layer represents 12,3 per cent of the azeotropic mixture and has the following percentage composition by volume as follows:

Carbon tetrachloride _____ 11
Alcohol _____ 60
Water _____ 29

The lower layer represents 87,7 per cent of the azeotropic mixture and has the percentage composition by volume as follows:

Carbon tetrachloride _____ 87,5
Alcohol _____ 12,0
Water _____ 0,5

The lower layer is again caused to enter the column through the conduit G' and is subjected to another distillation.

The upper layer proceeds through the conduit H' to the de-hydrating apparatus K'; the de-hydrating substance withdraws the water in the liquid state which is discharged through the cock M. The dehydrating substance, as above stated, may be any of the carbonates of sodium and potassium, sulphates of sodium, sulphates of copper, sulphates of magnesium, etc. These anhydrous salts are very hygroscopic, and may absorb the water from the liquids with which they are in contact in order to form hydrates; the hydrates themselves will absorb additional quantities of water if the liquids being treated are sufficiently hydrated. In the presence of liquids which are but slightly soluble in water, but are soluble in alcohol, experience shows that the anhydrous salts become hydrated and may even form aqueous solutions; it is this property that is utilized in the present process.

The binary mixture of carbon tetrachloride and alcohol which is situated at the upper part is again brought into the column through the conduit N. When distilled, it produces an azeotropic mixture whose boiling point is 64,5 degrees C.

The absolute alcohol is removed as vapour or liquid at P and is cooled in the refrigerating apparatus R.

Three regions are again formed in the column, under the same conditions as stated for Example I.

Example III

In this case ethyl acetate is the withdrawing body.

In the distilling column, A, Fig. 3, I dispose a quantity of ethyl acetate, I then introduce the commercial alcohol to be de-hydrated (in the state of liquid or vapour) through the tube B. The withdrawing body and alcohol are introduced preferably in quantities such that the withdrawing body and the water of the alcohol have the ratio given hereinafter in the azeotropic mixture, the alcohol being present in a greater percentage than given in the azeotropic mixture, however. The withdrawing body can also be present in a somewhat greater ratio. The column is heated by the worm tube C. The vapour mixture of an azeotropic nature is discharged through the conduit D at 70,3 degrees C. and has substantially the following percentage composition:

Ethyl acetate _____ 83,2
Alcohol _____ 9,5
Water _____ 7,3

The said mixture is condensed in the refrigerating condenser E and produces a homogeneous liquid which is discharged through the conduit $H^2$ into the de-hydrating apparatus $K^2$. The de-hydrating substance withdraws the water in the liquid state which is discharged through the cock M; the binary mixture of ethyl acetate and alcohol is evacuated at the upper part and is again brought into the column through the conduit N. When distilled, it produces an azeotropic mixture whose boiling point is 71,8 degrees C.

The absolute alcohol is removed as vapour or liquid at P and is cooled in the refrigerating apparatus R.

Three regions are formed in the column, as stated in the case of Example I.

What I claim is:—

1. A process for the manufacture of absolute alcohol from aqueous alcohol which comprises adding to the aqueous alcohol to be dehydrated a liquid chemically inert to alcohol and water having a boiling point which is near that of the alcohol, said liquid being capable of forming with water and alcohol a ternary azeotropic mixture with a minimum boiling point, distilling the azeotropic mixture from the mixture of aqueous alcohol and said liquid in a rectifying column until absolute alcohol is left as a residue, condensing the vapors, the resulting condensate becoming separated into two layers, treating with an inorganic dehydrating solid substance the layer of condensed liquid resulting from the condensation of the vapours of said azeotropic mixture which contains the greater amount of water, and recovering the alcohol therefrom by returning it to said distilling operation.

2. A process for the manufacture of absolute alcohol from aqueous alcohol which comprises adding to the aqueous alcohol to be dehydrated a liquid chemically inert to alcohol and water capable of forming with water and alcohol a ternary azeotropic mixture with a minimum boiling point adapted to separate into layers when condensed, distilling the azeotropic mixture from the mixture of aqueous alcohol and said liquid in a rectifying column, condensing the vapors, the resulting condensate becoming separated into two layers, treating with an inorganic dehydrating solid substance the layer of condensed liquid which contains the greater amount of water so as to remove the water therefrom and to obtain a binary mixture of the other two constituents, and distilling this mixture in the column used in the aforesaid distillation in such manner that absolute alcohol shall be separated from the binary mixture.

3. A process for the manufacture of absolute alcohol from aqueous alcohol which comprises adding to the aqueous alcohol to be dehydrated a liquid chemically inert to alcohol and water capable of forming with water and alcohol a ternary azeotropic mixture with a minimum boiling point adapted to separate into layers when condensed, distilling the azeotropic mixture from the mixture of aqueous alcohol and said liquid in a rectifying column, condensing the vapors, the resulting condensate becoming separated into two layers, treating with an inorganic dehydrating solid substance the layer of condensed liquid which contains the greater amount of water so as to remove the water therefrom and to obtain a binary mixture of the other two constituents, distilling this mixture in the column used in the aforesaid distillation in such manner that absolute alcohol shall be separated from the binary mixture, and distilling the layer which contains the lesser amount of water by introducing the same into the distilling column which served for the distillation of the ternary azeotropic mixture so as to recover absolute alcohol therefrom.

4. A process for the manufacture of absolute alcohol from aqueous alcohol which comprises adding to the aqueous alcohol to be dehydrated, gasoline which is free from all substances which boil below 80° C. and of which the temperature of boiling presents a total change from the beginning to the end of the distillation of a few degrees only, and which forms a ternary azeotropic mixture, distilling the azeotropic mixture from the mixture of aqueous alcohol and gasoline in a rectifying column until absolute alcohol is left as a residue, condensing its vapors, and treating a condensed product from the distilling column so as to separate therefrom the water and also the alcohol and the gasoline, which are then returned to the distilling column.

In testimony whereof I have signed this specification.

ELOI RICARD.